US010823278B2

United States Patent
Tezuka et al.

(10) Patent No.: US 10,823,278 B2
(45) Date of Patent: Nov. 3, 2020

(54) SILK HAT-TYPE STRAIN WAVE GEAR DEVICE (71) Applicant: HARMONIC DRIVE SYSTEMS INC., Shinagawa-ku, Tokyo (JP)

(72) Inventors: Shunichi Tezuka, Azumino (JP); Yoshihide Kiyosawa, Azumino (JP); Toshimi Yamagishi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 0 days.

(21) Appl. No.: 16/493,111

(22) PCT Filed: Apr. 10, 2017

(86) PCT No.: PCT/JP2017/014727
§ 371 (c)(1),
(2) Date: Sep. 11, 2019

(87) PCT Pub. No.: WO2018/189798
PCT Pub. Date: Oct. 18, 2018

(65) Prior Publication Data
US 2020/0072338 A1   Mar. 5, 2020

(51) Int. Cl.
*F16H 57/04* (2010.01)
*F16H 1/32* (2006.01)
(Continued)

(52) U.S. Cl.
CPC ....... *F16H 57/0469* (2013.01); *F01D 25/166* (2013.01); *F01D 25/18* (2013.01);
(Continued)

(58) Field of Classification Search
CPC ...... F16C 33/103; F16C 33/581; F16C 43/06; F16H 1/32; F16H 49/001; F16H 57/029;
(Continued)

(56) References Cited

U.S. PATENT DOCUMENTS 5,775,178 A * 7/1998 Asawa ................ F16H 49/001
74/640
5,934,157 A * 8/1999 Kobayashi ............ F16H 49/001
427/438
(Continued)

FOREIGN PATENT DOCUMENTS

DE  102015104308 A1 * 9/2016 ............ F16C 33/581
JP  H6012756 U    1/1985
(Continued)

OTHER PUBLICATIONS

International Search Report (PCT/ISA/210) dated Jun. 27, 2017, by the Japanese Patent Office as the International Searching Authority for International Application No. PCT/JP2017/014727.
(Continued)

*Primary Examiner* — Marcus Charles
(74) *Attorney, Agent, or Firm* — Buchanan Ingersoll & Rooney PC (57) ABSTRACT

A silk hat-type strain wave gear device has a crossed roller bearing for supporting an internal gear and an external gear so as to allow relative rotation. A first gap part between the inner and outer rings of said bearing is sealed by an oil seal and a second gap part thereof is in communication with a gear-side gap part on the outside of the external gear. A bearing seal separates the second gap part from the gear-side gap part. The bearing seal prevents excessive inflow of lubricant from the gear-side gap part into the second gap part. Excess lubricant that has flowed into the bearing can flow back from the second gap part to the gear-side gap part. Excess lubricant in the bearing is prevented from leaking through the oil seal to the outside.

7 Claims, 4 Drawing Sheets

(51) Int. Cl.
*F16H 49/00* (2006.01)
*F01D 25/16* (2006.01)
*F01D 25/18* (2006.01)
*F16C 33/10* (2006.01)
*F16C 33/58* (2006.01)

(52) U.S. Cl.
CPC .......... *F16C 33/103* (2013.01); *F16C 33/581* (2013.01); *F16H 1/32* (2013.01); *F16H 49/001* (2013.01); *F16H 57/0471* (2013.01); *F16H 57/0472* (2013.01)

(58) Field of Classification Search
CPC ............. F16H 57/0454; F16H 57/0469; F16H 57/0471; F01D 25/166; F01D 25/18; B25J 9/1025
USPC ............... 384/322, 477, 480, 484, 490, 584; 277/402, 407, 549, 460
See application file for complete search history.

(56) References Cited

U.S. PATENT DOCUMENTS

| | | | | |
|---|---|---|---|---|
| 5,984,048 | A | * | 11/1999 | Kiyosawa ............. F16H 49/001 184/6.12 |
| 2005/0141793 | A1 | | 6/2005 | Delano |
| 2016/0084367 | A1 | * | 3/2016 | Murayama ............ F16H 49/001 74/640 |
| 2017/0370457 | A1 | * | 12/2017 | Kobayashi .......... F16H 57/0486 |

FOREIGN PATENT DOCUMENTS

| | | | | |
|---|---|---|---|---|
| JP | S6170631 U | | 5/1986 | |
| JP | H09250611 A | | 9/1997 | |
| JP | 2000179545 A | | 6/2000 | |
| JP | 2000186718 A | | 7/2000 | |
| JP | 2002339991 A | | 11/2002 | |
| JP | 2004190706 A | | 7/2004 | |
| JP | 2007016838 A | | 1/2007 | |
| WO | WO-2014203294 A1 | * | 12/2014 | ............ F16C 33/586 |
| WO | 2015037105 A1 | | 3/2015 | |
| WO | WO-2017085794 A1 | * | 5/2017 | ........... F16H 49/001 |
| WO | WO-2018157910 A1 | * | 9/2018 | ........... F16H 57/025 |

OTHER PUBLICATIONS

Written Opinion (PCT/ISA/237) dated Jun. 27, 2017, by the Japanese Patent Office as the International Searching Authority for International Application No. PCT/JP2017/014727.

* cited by examiner

SILK HAT-TYPE STRAIN WAVE GEAR DEVICE

TECHNICAL FIELD

The present invention relates to a silk hat-type strain wave gear device. In particular, the present invention pertains to a silk hat-type strain wave gear device provided with a crossed roller bearing or other bearing to support an internal gear and an external gear in a relatively rotatable state.

BACKGROUND ART

A silk hat-type strain wave gear device has an internal gear and an external gear, between which a bearing such as a crossed roller bearing, for example, is arranged to support the internal and external gears in a state in which they are relatively rotatable with each other. The crossed roller bearing is formed with gap parts on both sides of rollers between inner and outer races thereof. One of the gap parts, which is an outer gap part opening to the outside, is sealed by an oil seal to prevent lubricant from leaking to the outside. Silk hat-type strain wave gear devices of this configuration are disclosed in Patent documents 1 and 2.

Gap is provided on the outer peripheral side of an external gear so that the external gear, which is flexed in a radial direction, does not interfere with components arranged on the outer peripheral side of the external gear. In Patent document 1, there is formed an annular gap along the cylindrical body and diaphragm of an external gear between the external gear and the inner race of a crossed roller bearing surrounding the outer periphery of the external gear. In Patent document 2, an annular gap is formed between an external gear and the inner peripheral-side portion of an internal gear. The internal gear is fixed to the inner race of a crossed roller bearing that surrounds the outer periphery of the external gear.

PRIOR ART DOCUMENT

Patent Document

Patent document 1: JP 2000-186718 A
Patent document 2: JP 2007-16838 A

SUMMARY OF THE INVENTION

Problems to be Solved by the Invention

The gap formed along the outer peripheral surface of the external gear extends from a meshing section between the external and internal gears to the inner end face of the crossed roller bearing. A gap between the inner and outer races opens on the inner end face of the crossed roller bearing. This gap is therefore communicated with the gap formed along the outer peripheral surface of the external gear.

During operation of the strain wave gear device, the external gear is repeatedly flexed in the radial direction while the external gear or the internal gear is rotated. Accompanied by this operation, lubricant which is being supplied to the meshing section is pushed out to the outer peripheral side of the external gear through the gap formed along the outer peripheral surface of the external gear, and flows into the crossed roller bearing through the gap thereof. The lubricant flowed into the crossed roller bearing remains therein because the opposite-side gap of the crossed roller bearing is sealed by an oil seal. However, if excessive amount of lubricant flows into the crossed roller bearing, there is a possibility that lubricant be leaked to the outside from the oil seal.

An object of the present invention is to provide a silk hat-type strain wave gear device which can prevent or limit lubricant from leaking to the outside from the bearing.

Means of Solving the Problems

In order to solve the above problems, a silk hat-type strain wave gear device of the present invention has:

a rigid internal gear;

an external gear having a silk hat shape, the external gear being provided with a flexible cylindrical body coaxially arranged inside the internal gear, external teeth formed on the cylindrical body, a diaphragm extending outward in a radial direction from an end of the cylindrical body, and an annular rigid boss formed continuously on an outer peripheral edge of the diaphragm;

a wave generator for flexing the cylindrical body of the external gear into a non-circular shape to mesh the external teeth with internal teeth of the internal gear and for moving a meshing position of the external teeth with the internal teeth in a circumferential direction;

a bearing for supporting the internal gear and the external gear in a relatively rotatable state;

a gear-side gap part having an annular cross-section, the gear-side gap part extending along the diaphragm and the cylindrical body from the outer peripheral edge of the diaphragm of the external gear to a meshing section between the external teeth and the internal teeth;

a first gap part having an annular cross-section and a second gap part having an annular cross-section, the first gap part being formed between inner and outer races of the bearing and being opened in one first end face of the bearing, the second gap part being formed between the inner and outer races of the bearing and being opened in the other second end face of the bearing;

an oil seal for sealing the first gap part; and
a bearing seal for separating the second gap part from the gear-side gap part, wherein the bearing seal seals an opening end of the second gap part communicating with the gear-side gap part from a side of the gear-side gap part, in a manner that the bearing seal prevents lubricant from flowing into the second gap part from the gear-side gap part and allows lubricant to flow out to the gear-side gap part from the second gap part.

The bearing seal blocks between the gear-side gap part and the second gap part of the bearing, which prevents or limits excessive amount of lubricant form flowing into the bearing. In addition, excess lubricant that has flowed into the bearing can flow back to the gear-side gap part through the bearing seal. Thus, the excess lubricant flowed into the bearing is prevented or limited from leaking through the oil seal to the outside.

In addition, different from a case in which a typical oil seal is used to seal the second gap part, the bearing seal allows lubricant to flow out to the gear-side gap part from the second gap part of the bearing. Excessive lubricant that has supplied to the bearing can be returned to the gear-side gap part through the bearing seal before leaking out from the oil seal side.

In the silk hat-type strain wave gear device of the present invention, the inner race of the bearing can be arranged between the diaphragm and the internal gear in a direction of a center axis line and be directly fixed to the internal gear. While, the outer race can be directly fixed to the rigid boss. In this case, the gear-side gap part includes, from the side of the meshing section, an axial-direction gap section formed between the cylindrical body and the inner peripheral surface of the inner race and a radial-direction gap section formed between the diaphragm and the an end face of the inner race. The opening end of the second gap part is positioned at an outer-peripheral-side portion of the radial-direction gap section. In this case, the bearing seal can be formed to have an annular outer-peripheral-side seal part for sealing a joint surface between the outer race and the rigid boss and an annular inner-peripheral-side seal part that extends from the outer-peripheral-side seal part into the radial-direction gap part and seals an opening end of the second gap part.

The outer-peripheral-side seal part of the bearing seal seals the joint surface between the outer race and the rigid boss. Thus, O-ring or another seal member become unnecessary for sealing the joint surface between the outer race and the rigid boss.

Here, it is possible that an annular bearing-seal plate be attached to an inner-race end face where the opening end of the inner race is located so that it covers the inner-race end face, and that the inner-peripheral-side seal section of the bearing seal be pressed against the bearing-seal plate in a slidable state.

Because the bearing seal is fixed to the side of the outer race, the inner-peripheral-side seal section thereof relatively slides along the inner-race end face. There is a case in which steps, cuts or the like are formed on the inner-race end face. The inner-peripheral-side seal section that slides on the inner-race end face can be damaged by steps, cuts or the like, and the sealing property thereof can be deteriorated. These defects can be avoided by providing the bearing-seal plate and making the inner-peripheral-side seal section to slide along the flat surface thereof.

For example, in such a type of bearing is used in which rolling elements are inserted between outer and inner races from an insertion hole formed in the inner race, the inner-race end face is formed with steps or cuts between an insertion hole and a plug that seals the insertion hole. In this case, the bearing-seal plate is attached to the inner-race end face to cover the insertion hole and the plug.

Next, in order to reliably prevent lubricant from leaking out to the outside through the oil seal from the bearing, an annular partition plate can be arranged in the first gap part, the partition plate being located adjacent to the oil seal at the side of the rolling elements. The partition plate is, for example, press fitted to the outer peripheral surface of the inner race. In addition, a labyrinth seal is formed between the partition plate and the inner peripheral surface part of the outer race facing the partition plate.

It is possible that the first gap part be provided with an annular sheet made from non-woven fabrics or other porous material at a position adjacent to the oil seal at the side of the rolling elements. The sheet can be sandwiched between the outer race and the oil seal, for example.

MODE FOR CARRYING OUT THE INVENTION

An embodiment of a silk hat-type strain wave gear device according to the present invention will be described with reference to the drawings. The embodiment described below is an example of the present invention but is not intended to limit the present invention to the structure thereof.

Figure 1A:
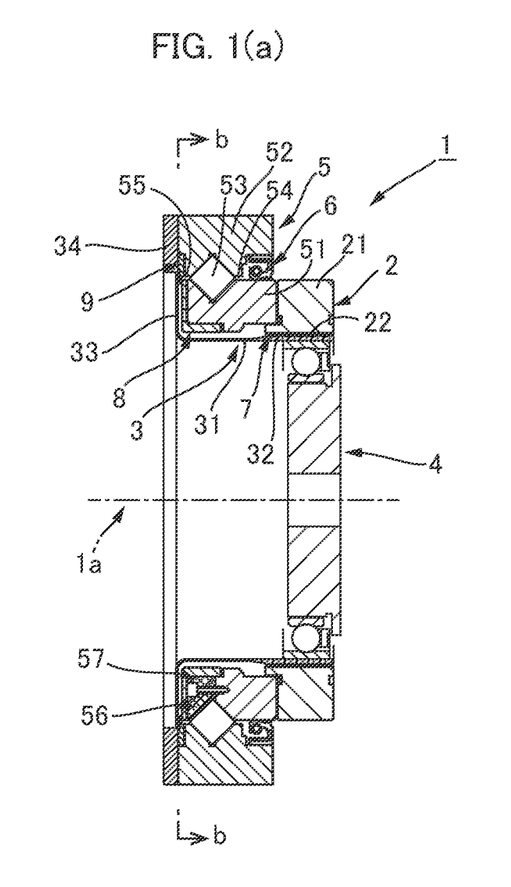
FIG. 1(a) is a schematic longitudinal cross-sectional view taken along the cross-sectional line a-a of FIG. 1(b) illustrating an embodiment of a silk hat-type strain wave gear device according to the present invention and FIG. 1(b) is a schematic end view thereof.
Figure 1B:
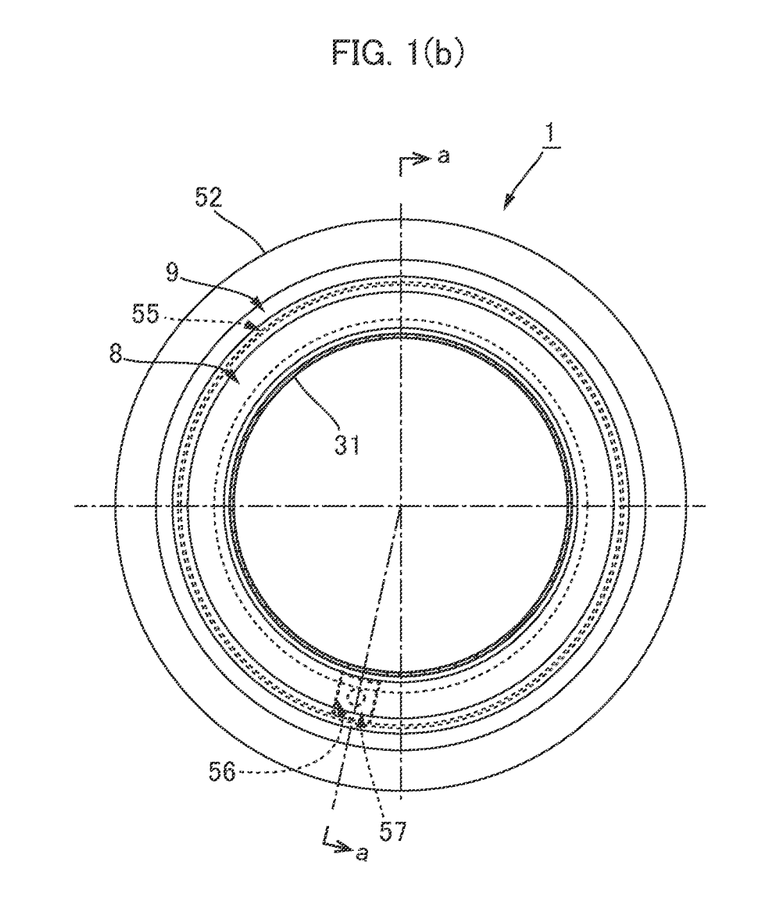
Figure 2:
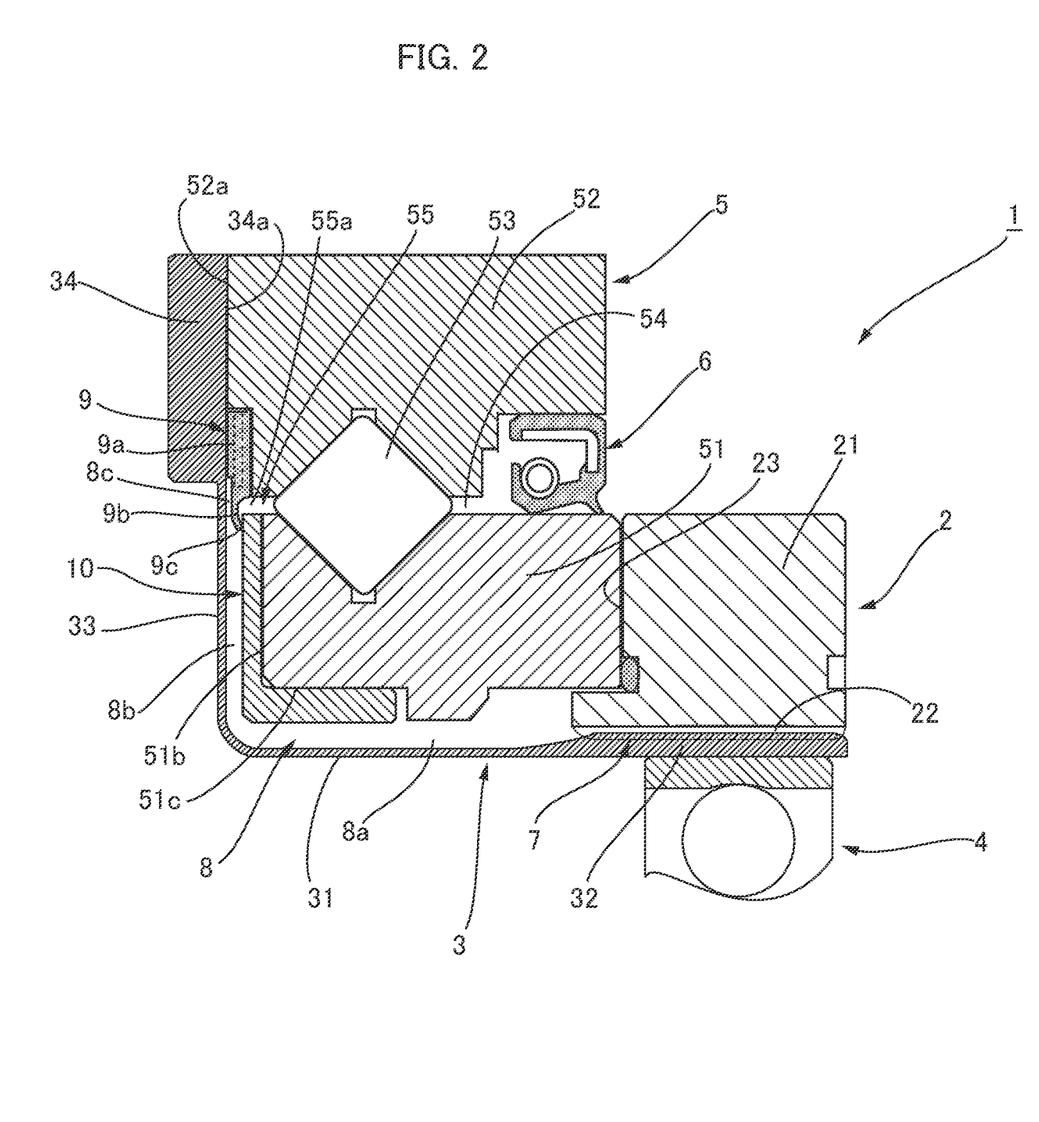
FIG. 2 is a partial cross-sectional view of a silk hat-type strain wave gear device.

FIG. 1(a) is a schematic longitudinal cross-sectional view illustrating a silk hat-type strain wave gear device when cut along line a-a of FIG. 1(b), and FIG. 1(b) is a schematic end view thereof when cut along line b-b of FIG. 1(a). FIG. 2 is a partial cross-sectional view of a silk hat-type strain wave gear device. A silk hat-type strain wave gear device 1 (hereinafter simply refer to as "a strain wave gear device 1") is provided with a rigid internal gear 2, a flexible external gear 3 coaxially arranged inside the internal gear 2, a wave generator 4 arranged inside the external gear 3, and a crossed roller bearing 5 (hereinafter simply refer to as "a bearing 5") for supporting the internal gear 2 and the external gear 3 in a relatively rotatable state.

The internal gear 2 has an annular member 21 of an approximately rectangular cross-section, a circular inner peripheral surface of which is formed with internal teeth 22. The external gear 3 has a silk hat shape and is provided with a cylindrical body 31 that is flexible in the radial direction, external teeth 32 formed on the outer peripheral surface part at the side of the front-end opening of the cylindrical body 31, a discoid diaphragm 33 extending outward in the radial direction from the rear end part of the cylindrical body 31, and an annular rigid boss 34 that has a rectangular cross-section and is formed continuously on the outer peripheral edge of the diaphragm 33. The wave generator 4 causes the cylindrical body 31 of the external gear 3 to flex into a non-circular shape, for example, an elliptical shape and mesh external teeth 32 with internal teeth 22, and causes meshing positions of the external teeth 32 with the internal teeth 22 to rotate in the circumferential direction.

The bearing 5 is arranged in a state coaxially surrounding the cylindrical body 31 of the external gear 3. The bearing 5 has an inner race 51 that is positioned between the diaphragm 33 of the external gear 3 and the internal gear 2 when viewed along a direction of a center axis line 1a, and that is coaxially fixed to an annular end face 23 of the internal gear 2. The bearing 5 has an outer race 52 that is arranged adjacent to the rigid boss 34 and is coaxially fixed to an annular end face 34a of the rigid boss 34. Rollers 53 are inserted into a raceway groove having a rectangular cross-section formed between the inner race 51 and the outer race 52 of the bearing 5. A first gap part 54 and a second gap part 55 are formed on both sides of the raceway groove. The first gap part 54 located at the side of the internal gear 2 is opened to the outside from one end face of the bearing 5, while the second gap part 55 is opened on the other end face of the bearing 5. The first gap part 54 opening to the outside is sealed by an oil seal 6.

The strain wave gear device 1 is provided with a gear-side gap part 8 having an annular cross section, the gear-side gap part extending from a meshing section 7 of the internal teeth 22 and the external teeth 32 along the cylindrical body 31 and the diaphragm 33 of the external gear 3. The gear-side gap part 8 is provided with, from the meshing section 7, an axial-direction gap section 8a formed between the cylindrical body 31 and the inner peripheral surface of the inner race 51 and a radial-direction gap section 8b formed between the diaphragm 33 and the inner race 51. The second gap part 55 of the bearing side has an opening end 55a that is positioned in a portion of an outer-peripheral-end side of the radial-direction gap part 8b.

The radial-direction gap part 8b is separated from the second gap part 55 of the bearing side by an annular bearing seal 9. In this embodiment, an opening end 55a of the second gap part 55 is sealed by the annular bearing seal 9 from the side of the radial-direction gap part 8b. The bearing seal 9 can prevent inflow of lubricant from the gear-side gap part 8 to the second gap part 55, and at the same time allows lubricant to flow out to the gear-side gap part 8 from the second gap part 55.

The bearing 5 is such a type of bearing in which the rollers 52 are inserted into the raceway groove between the inner race 51 and the outer race 52 from the insertion hole 56 formed in the inner race 51. The insertion hole 56 opens across the inner-race end face 51b and the inner-race inner peripheral surface 51c. The insertion hole 56 is sealed by a plug 57 attached thereto. A bearing-seal plate 10 of having an L-shaped cross-section is attached in a state in which it covers the inner-race end face 51b and a part of the inner-race inner peripheral surface 51c. The bearing-seal plate 10 covers and hides the insertion hole 56 and the plug 57, and also steps, cuts and the like formed between the insertion hole and the plug. The bearing-seal plate 10 is a metal plate, for example.

The bearing seal 9 is provided with: an annular outer-peripheral-side seal part 9a that seals the joint surfaces (52a and 34a) between the outer race 52 and the rigid boss 34; and an annular inner-peripheral-side seal part 9b that extends from the outer-peripheral-side seal part 9a into the radial-direction gap part 8b and seals the opening end 55a of the second gap part 55.

The outer-peripheral-side seal part 9a is constituted by a metal ring and a synthetic rubber such as a nitrile rubber and is formed to have an approximately rectangular cross-section. The outer race 52 has an end face 52a that is in contact with the annular end face 34a of the rigid boss 34 and is formed at an inner-peripheral edge part thereof with a cutout having a rectangular cross section. The outer-peripheral seal part 9a is accommodated in the cutout. The inner-peripheral-side seal part 9b (a seal lip part) extends in an inclined direction toward the inner-race side from the inner-peripheral edge of the outer-peripheral-side seal part 9a, the inner-peripheral-side seal part 9b being made from synthetic rubber and is smaller in width than the outer-peripheral-side seal part. The tip end 9c (a lip tip end) of the inner-peripheral-side seal part 9b is pressed against the bearing-seal plate 10 in a slidable state. a gap 8c is formed between the bearing seal 9 and the diaphragm 33. With the gap 8c, the diaphragm 33 of the external gear 3 flexed by the wave generator 4 is prevented from interfering with the bearing seal 9.

The strain wave gear device 1 of the present embodiment is provided with the bearing seal 9 that functions as a check valve. It is possible to prevent lubricant for lubricating the meshing section 7 and other sections from flowing into the second gap part 55 in the bearing 5 from the gear-side gap part 8. Thus, excessive amount of lubricant can be prevented or limited from flowing into the bearing 5 (the second gap part 55, the raceway groove, the first gap part 54). In addition, even when excessive lubricant flows into the bearing 5, it returns to the gear-side gap part 8 through the bearing seal 9 without leaking outside from the outer oil seal 6. Therefore, lubricant can be prevented or limited from leaking outside from the oil seal 6 of the bearing 5.

In a Case of a Crossed Roller Bearing of Outer-Race Divided Type

The above-mentioned crossed roller bearing 5 is a bearing in which the rollers 53 are inserted from the insertion hole 56 formed in the inner race 51. A crossed roller bearing of an outer-race divided type can also be employed.

Figure 3:
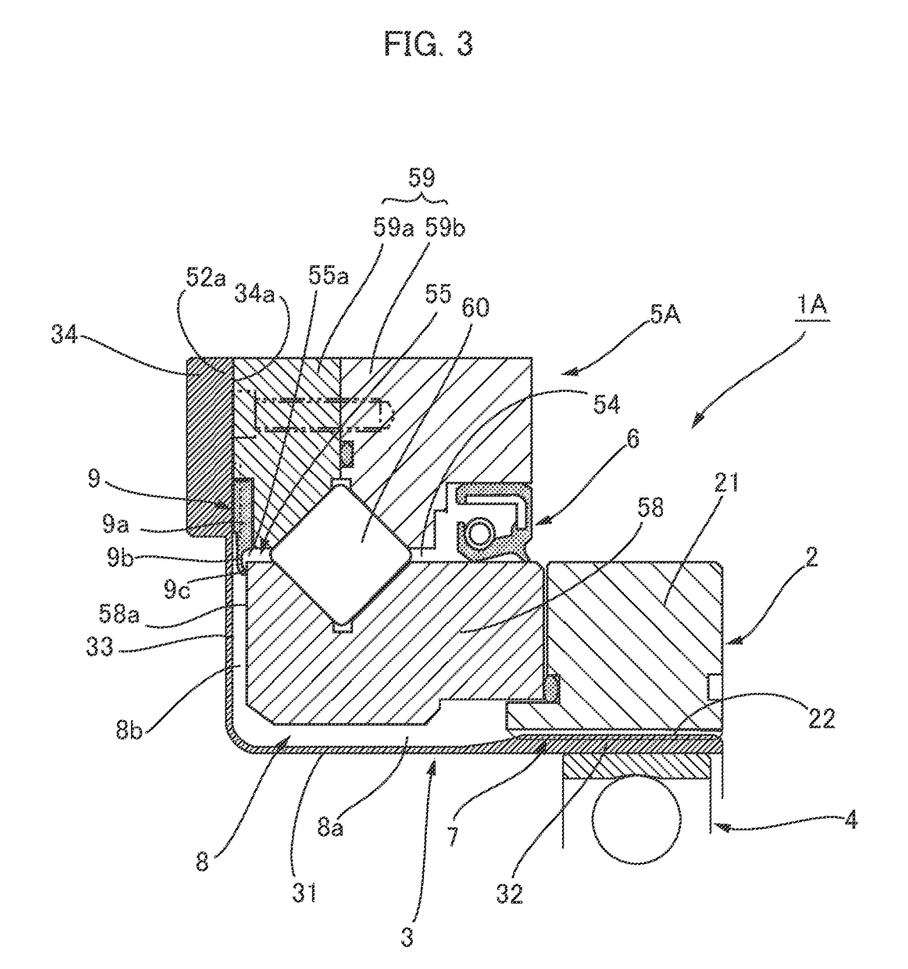
FIG. 3 is a partial cross-sectional view illustrating a case in which a crossed roller bearing of the outer-race divided type is employed.

FIG. 3 is a partial cross-sectional view illustrating a silk hat-type strain wave gear device in which a crossed roller bearing of an outer-race divided type is employed. Since a silk hat-type strain wave gear device 1A has the basic structure that is the same as that of the above-mentioned strain wave gear device 1, the corresponding portions are denoted by the same reference numerals and their explanations are omitted. A crossed roller bearing 5A of this embodiment is provided with an inner race 58, an outer race 59 constituted by two outer-race pieces 59a and 59b coaxially fixed with each other in the axial direction, and a plurality of rollers 60 inserted between the inner and outer races. A bearing seal 9 has an inner-peripheral-side seal part 9b, a tip end 9c of which extends to an inner-race end face 58a of the inner race 58 beyond an opening end 55a of a second gap part 55. In addition, an inner-peripheral-side seal part 9b has a tip end 9c that is pressed against the inner-race end face 58a of the inner race 58 in a slidable state to seal the opening end 55a.

Examples of the Oil Seal

Figure 4A:
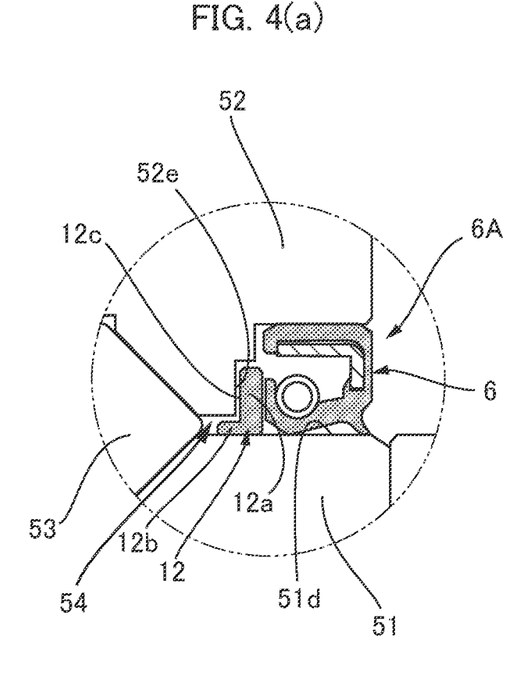
FIGS. 4(a) and 4(b) are explanatory views illustrating an example of an oil-seal structure of the bearing.
Figure 4B:
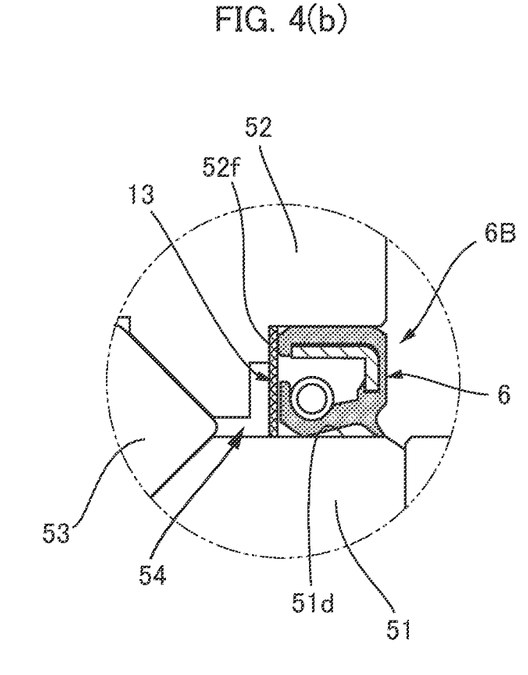

FIGS. 4(a) and 4(b) are partially enlarged cross-sectional views illustrating two examples of oil seal structure to seal the first gap part 54 of the crossed roller bearing 5. These oil seal structures can be used instead of the above oil seal 6.

An oil seal structure 6A illustrated in FIG. 4(a) has an oil seal 6 and a partition plate 12 in the first gap part 54, the partition plate being located adjacent to the oil seal 6 at the side of rollers 53. The partition plate 12, which is made from resin material and is formed to have an L-shaped cross-sectional shape, is provided with an annular part 12a and a press-fitting cylindrical part 12b integrally formed on the inner-peripheral edge of the annular part 12a. The press-fitting cylindrical body 12b is press-fitted and fixed to the outer peripheral surface 51d of the inner race 51.

The outer race 52 is formed at an inner peripheral surface thereof with an inner peripheral surface part 52e having a stepped profile, the inner peripheral surface part corresponding to an outer peripheral surface part 12c having a stepped profile of the partition plate 12. These outer peripheral surface part 12c and inner peripheral surface part 52e face to each other across a very small gap so as to form a labyrinth seal. Lubricant is reliably prevented from leaking outside by means of the partition plate 12 and the oil seal 6.

An oil seal structure 6B illustrated in FIG. 4(b) has an oil seal 6 and an annular sheet 13 in a first gap part 54, the sheet being located adjacent to the oil seal 6 at the side of rollers 53 and being made from non-woven fabrics or other porous materials. For example, Himeron (product name) sheet can be used.

The sheet 13 is sandwiched between an annular stepped surface 52f formed on the inner-peripheral surface part of the outer race 52 and the oil seal 6 press-fitted and fixed to the inner peripheral surface of the outer race. Lubricant is reliably prevented from leaking to the outside by means of the sheet 13 and the oil seal 6.

In addition, foreign matters entering from outside through the oil seal 6 are captured by the sheet 13, whereby reliably preventing foreign matters from entering the raceway groove.

Another Embodiment

The above-mentioned embodiment employs the crossed roller bearing 5 to support the internal gear and the external gear in a relatively rotatable state. Another bearing such as double-row ball bearing can be employed instead of the crossed roller bearing 5.

The invention claimed is:

1. A silk hat-type strain wave gear device comprising:
   a rigid internal gear;
   an external gear having a silk hat shape, the external gear being provided with a flexible cylindrical body coaxially arranged inside the internal gear, external teeth formed on the cylindrical body, a diaphragm extending outward in a radial direction from an end of the cylindrical body, and an annular rigid boss formed continuously on an outer peripheral edge of the diaphragm;
   a wave generator for flexing the cylindrical body of the external gear into a non-circular shape to mesh the external teeth with internal teeth of the internal gear and for moving a meshing position of the external teeth with the internal teeth in a circumferential direction;
   a bearing for supporting the internal gear and the external gear in a relatively rotatable state;
   a gear-side gap part having an annular cross-section, the gear-side gap part extending along the diaphragm and the cylindrical body from the outer peripheral edge of the diaphragm of the external gear to a meshing section between the external teeth and the internal teeth;
   a first gap part and a second gap part, the first gap part being formed between an inner race and an outer race of the bearing and being opened in one first end face of the bearing, the second gap part being formed between the inner race and the outer race of the bearing and being opened in a second end face of the bearing;
   an oil seal for sealing the first gap part; and
   a bearing seal for separating the second gap part from the gear-side gap part,
   wherein the bearing seal seals an opening end of the second gap part communicating with the gear-side gap part from a side of the gear-side gap part, such that the bearing seal prevents lubricant from flowing into the second gap part from the gear-side gap part and allows lubricant to flow out to the gear-side gap part from the second gap part.

2. The silk hat-type strain wave gear device according to claim 1,
   wherein the inner race of the bearing is located between the diaphragm and the internal gear in a direction of a center axis line and is coaxially fixed to the internal gear;
   the outer race of the bearing is coaxially fixed to the rigid boss;
   the gear-side gap part comprises, from the meshing section, an axial-direction gap section formed between the cylindrical body and the inner peripheral surface of the inner race and a radial-direction gap section formed between the diaphragm and an end face of the inner race;
   the opening end of the second gap part is positioned at an outer peripheral side portion of the radial-direction gap section; and
   wherein the bearing seal comprises:
      an annular outer-peripheral-side seal part for sealing a joint surface between the outer race and the rigid boss; and
      an annular inner-peripheral-side seal part that extends from the outer-peripheral-side seal part into the radial-direction gap part and seals an opening end of the second gap part.

3. The silk hat-type strain wave gear device according to claim 2, further comprising:
   an annular bearing-seal plate that is attached to an inner-race end face of the inner race in a state covering the inner-race end face where the opening end of the second gap part is located, and
   wherein the inner-peripheral-side seal section of the bearing seal is pressed against the bearing-seal plate in a slidable state.

4. The silk hat-type strain wave gear device according to claim 3,
   wherein the inner race of the bearing has an insertion hole for inserting rolling elements between the inner race and the outer race and a plug for sealing the insertion hole;
   the insertion hole opens in the inner-race end face; and
   the insertion hole and the plug are covered and hidden by the bearing-seal plate.

5. The silk hat-type strain wave gear device according to claim 1, further comprising:
   an annular partition plate arranged in the first gap part and located adjacent to the oil seal at a side of rolling elements of the bearing;
   wherein the partition plate is fixed to the inner race, and
   a labyrinth seal is formed between the partition plate and the inner peripheral surface part of the outer race facing the partition plate.

6. The silk hat-type strain wave gear device according to claim 1, further comprising:
   an annular sheet made from a porous material, the annular sheet being arranged in the first gap part and located adjacent to the oil seal at the side of rolling elements of the bearing.

7. The silk hat-type strain wave gear device according to claim 1, further comprising:
   an annular bearing-seal plate that is attached to an inner-race end face of the inner race in a state covering the inner-race end face where the opening end of the second gap part is located;
   wherein the bearing is a crossed roller bearing;
   the inner race of the crossed roller bearing has an insertion hole for inserting rolling elements between the inner race and the outer race and a plug for sealing the insertion hole;
   the insertion hole opens in the inner-race end face;
   the bearing-seal plate is attached to the inner-race end face to cover and hide the insertion hole and the plug;
   the inner race is located between the diaphragm and the internal gear in an axial direction and is coaxially fixed to the internal gear;
   the outer race is coaxially fixed to the rigid boss;
   the gear-side gap part comprises an axial-direction gap section formed between the cylindrical body and the inner peripheral surface of the inner race and a radial-direction gap section formed between the diaphragm and an end face of the inner race when viewed from the meshing part;
the opening end of the second gap part is positioned at an outer peripheral side portion of the radial-direction gap section; and
wherein the bearing seal comprises:
an annular outer-peripheral-side seal part for sealing a joint surface between the outer race and the rigid boss; and
an annular inner-peripheral-side seal part that extends from the outer-peripheral-side seal part into the radial-direction gap part and seals an opening end of the second gap part,
the inner-peripheral-side seal part of the bearing seal being pressed against the bearing-seal plate in a slidable state.

* * * * *